(12) United States Patent
Cheng

(10) Patent No.: US 8,573,438 B1
(45) Date of Patent: Nov. 5, 2013

(54) REMOVABLE HANDLE FOR MODULAR COOKWARE

(75) Inventor: Peter Cheng, Yongkang (CN)

(73) Assignee: Magellan Group, Ltd., Blaine, WA (US)

(*) Notice: Subject to any disclaimer, the term of this patent is extended or adjusted under 35 U.S.C. 154(b) by 0 days.

(21) Appl. No.: 13/456,019

(22) Filed: Apr. 25, 2012

(51) Int. Cl.
*A47J 45/07* (2006.01)

(52) U.S. Cl.
USPC ............... 220/759; 16/422; 16/425; 16/426; 294/30

(58) Field of Classification Search
USPC .............................. 220/573.1, 752, 753, 759
See application file for complete search history.

(56) References Cited

U.S. PATENT DOCUMENTS

| | | | |
|---|---|---|---|
| 2,220,879 A | 11/1940 | Hayden et al. | |
| 4,083,081 A | 4/1978 | Witte | |
| 4,577,367 A | 3/1986 | Durand | |
| 6,260,733 B1 | 7/2001 | Eimerman | |
| 6,439,421 B1 * | 8/2002 | Lin | 220/759 |
| 6,694,868 B1 * | 2/2004 | Hung | 99/403 |
| 2005/0145637 A1 | 7/2005 | Lin | |
| 2009/0099566 A1 * | 4/2009 | Maness et al. | 606/62 |

* cited by examiner

*Primary Examiner* — Mickey Yu
*Assistant Examiner* — Allan Stevens
(74) *Attorney, Agent, or Firm* — Dwayne E. Rogge; Schacht Law Office, Inc.

(57) ABSTRACT

This application relates to the field of removable handles for cookware. The use of a single interchangeable and removable handle with different pieces of cookware has several advantages. One advantage is that the overall assembly is much smaller to store, as the handle may be removed and stored in a separate location, reducing the overall size of the assembly. In addition, a single handle may be utilized for multiple cooking vessels as it is common for only one handle to be utilized at a single time. Even though multiple cooking vessels may be used simultaneously, the handle is only utilized for repositioning or stabilizing the cooking vessel. In this way, when no cooking vessel is in use, only one handle need be stored, rather than separate (possibly attached) handles for each article of cookware.

6 Claims, 5 Drawing Sheets

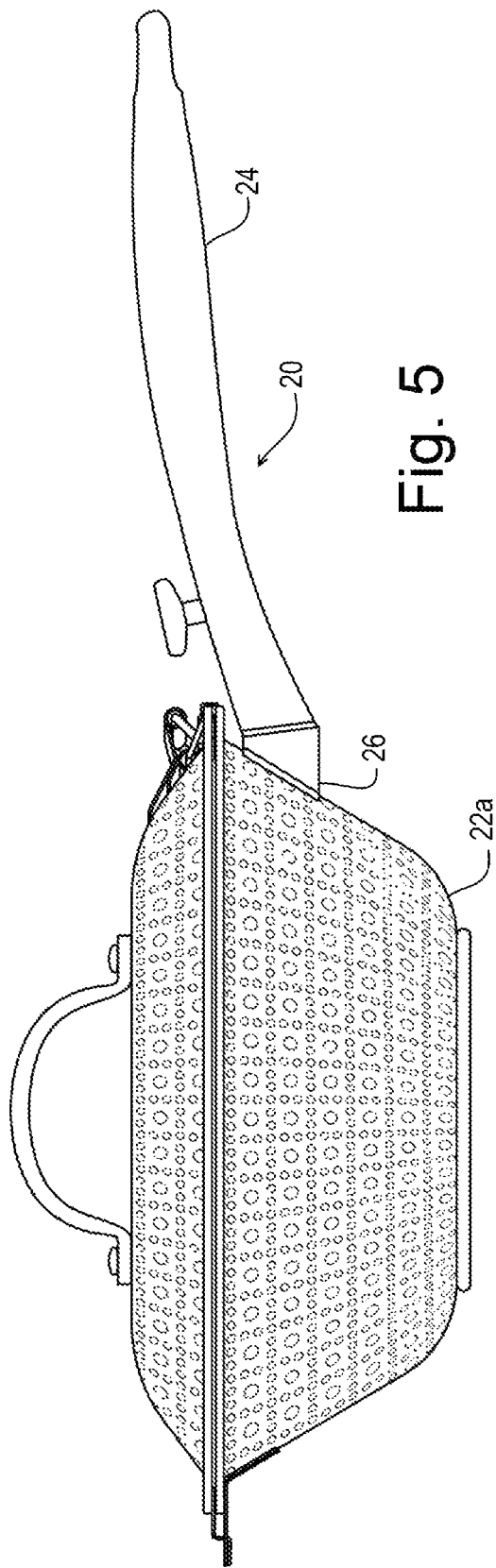

REMOVABLE HANDLE FOR MODULAR COOKWARE

BACKGROUND OF THE DISCLOSURE a) Field of the Disclosure

This application relates to the field of removable handles for cookware.

SUMMARY OF THE DISCLOSURE

Disclosed herein is a system of cookware such as pots and pans, with a removable and interchangeable handle.

The use of a single interchangeable and removable handle with different pieces of cookware has several advantages. One advantage is that the overall assembly is much smaller to store, as the handle may be removed and stored in a separate location, reducing the overall size of the assembly. In addition, a single handle may be utilized for multiple cooking vessels as it is common for only one handle to be utilized at a single time. Even though multiple cooking vessels may be used simultaneously, the handle is only utilized for repositioning or stabilizing the cooking vessel. In this way, when no cooking vessel is in use, only one handle need be stored, rather than separate (possibly attached) handles for each article of cookware. On additional advantage is cost. As the handle portion is interchangeable, it is possible to provide a system of pots, pans, colanders, bowls, etc. where a single handle may be purchased to be removably attached to several different pots/pans.

Disclosed herein is a removable handle system for cookware. The handle in one form comprising: a removable portion having a longitudinal grasping portion, a proximal end, an upper surface, a lower surface and a distal end. A user engagement button in one form is provided, extending vertically from the upper surface through a surface defining a void in the upper surface of the removable portion. The user engagement button comprising: a piston substantially within the removable portion, the piston having an upper portion with a radially outward surface having an upper diameter. The previously described piston having a lower portion with a radially outward surface having a lower diameter where the lower diameter is larger than the upper diameter;

In one form, a compression spring is positioned within the grasping portion between the piston and the lower surface of the removable portion. The compression spring is configured to bias the user engagement button upwards. In one form, the compression spring is contained at least partially within the radially outward surface defining a lower diameter of the piston.

The removable portion in one form also comprises a surface defining a slot through the proximal end of the removable portion. This slot may be cut or formed into the removable portion, or may be formed in a separate face plate which is then attached to the removable portion, forming an integral component thereof.

Another component of the system is a bracket attached to each item of cookware. The bracket in one form comprising a tongue having an outer surface smaller vertically and transversely than the surface defining the slot in the removable portion so as to fit there within. The tongue in one form comprising: a surface defining a passage which is wider transversely than the diameter of the upper portion of the piston, and narrower transversely than the diameter of the lower portion of the piston.

In one form, the button and the piston are removable from each other and comprise interoperating threaded portions to facilitate attachment of the two components.

The removable handle system for cookware as recited above may be arranged wherein the user engagement button comprises a user engagement surface, which is substantially larger than the cross sectional area of the user engagement button where the user engagement button passes through the surface defining a void in the upper surface of the removable portion.

BRIEF DESCRIPTION OF THE DRAWINGS

FIG. 5 is a side view of the lidded cookware of FIG. 3 with a removable handle according to one embodiment of this disclosure.

FIG. 6 is a partial cutaway view show of one example of the piston and compression spring.

DESCRIPTION OF THE PREFERRED EMBODIMENTS

Figure 3:
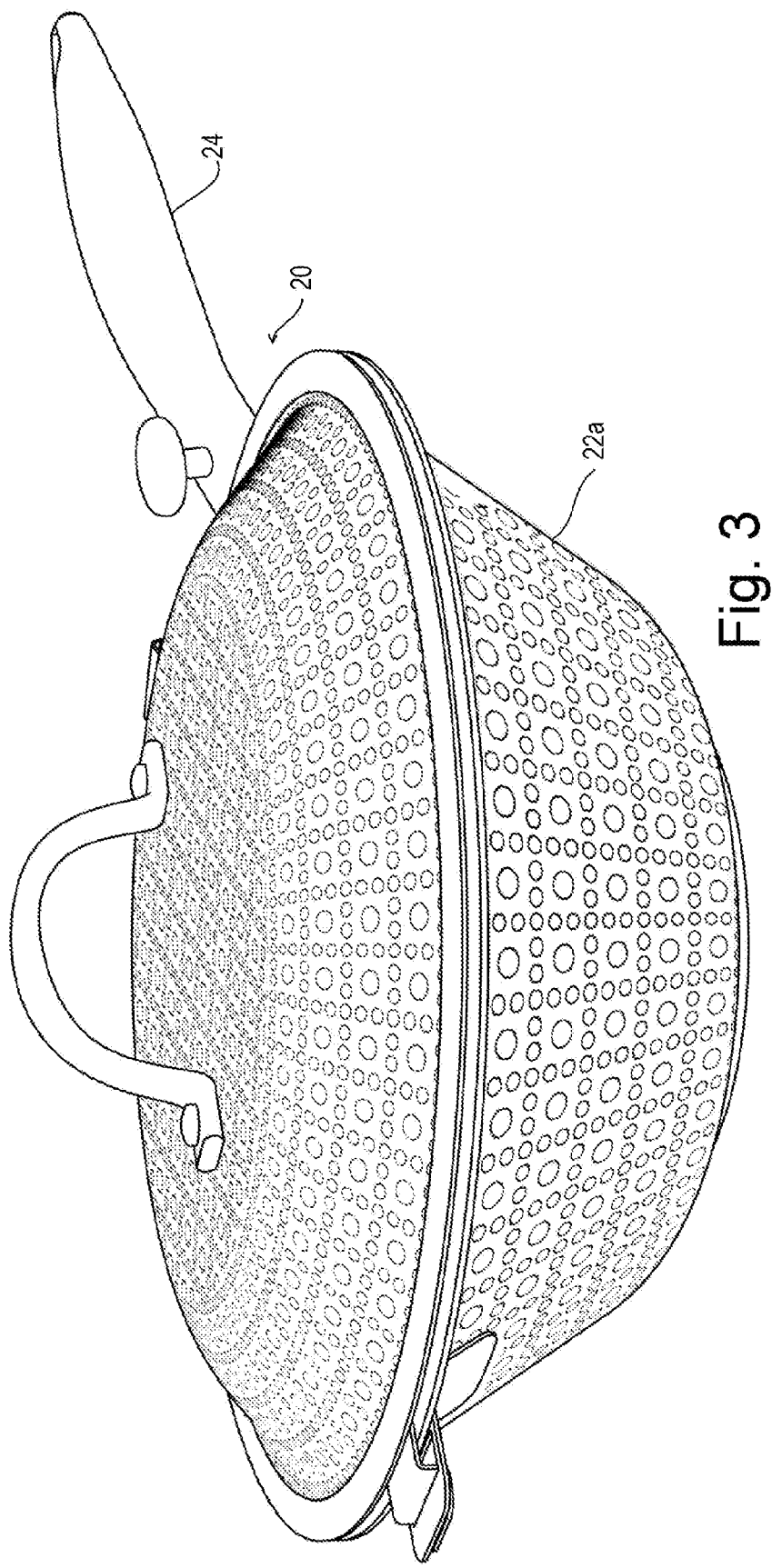
FIG. 3 is an isometric view of a lidded cookware with a removable handle according to one embodiment of this disclosure.
Figure 4:
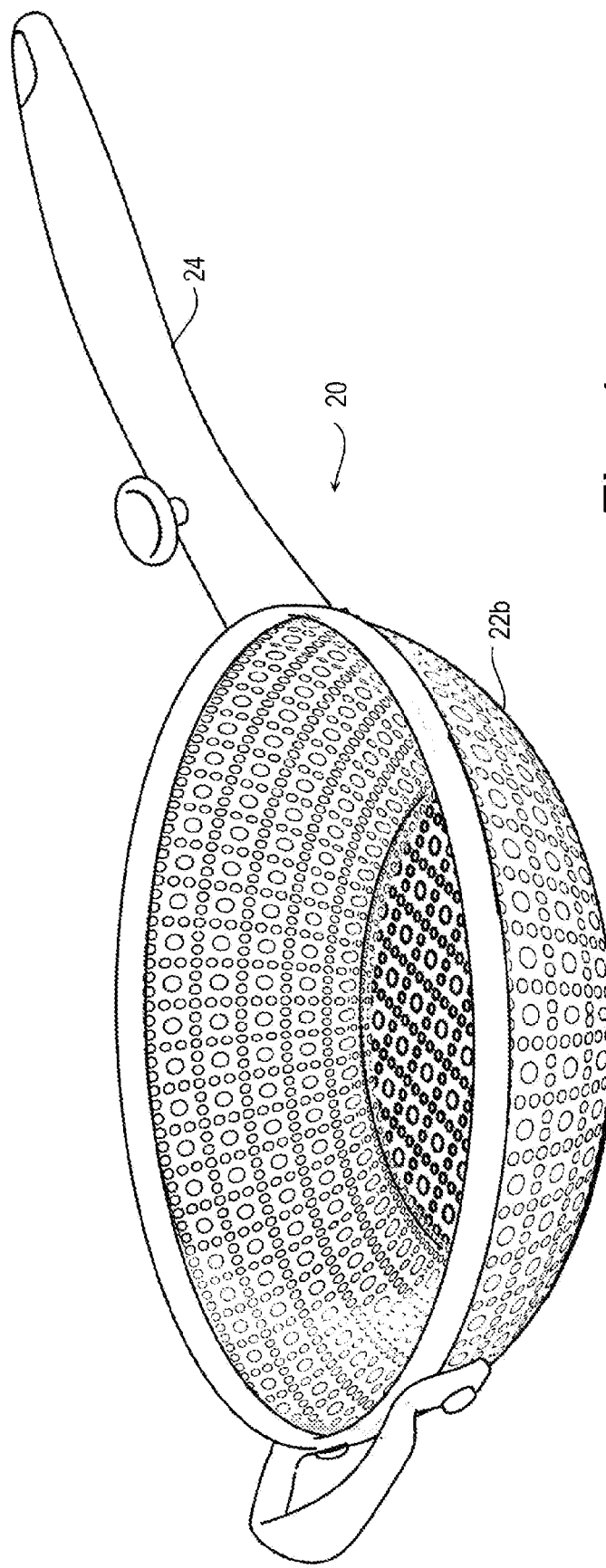
FIG. 4 is an isometric view of an article of two-handled cookware with a removable handle according to one embodiment of this disclosure.

Disclosed herein is a removable handle 20 for attachment to cookware 22, as shown in FIGS. 3, 4, and 5. A numbering convention is used herein within a numeric prefix defines a general element and an alphabetic suffix denotes a particular embodiment of that general element. For example, the cookware shown in FIGS. 3, 4, and 5 are denoted with the numeric prefix (22) and each particular embodiment is presented with an alphabetic suffix (a-b).

Figure 1:
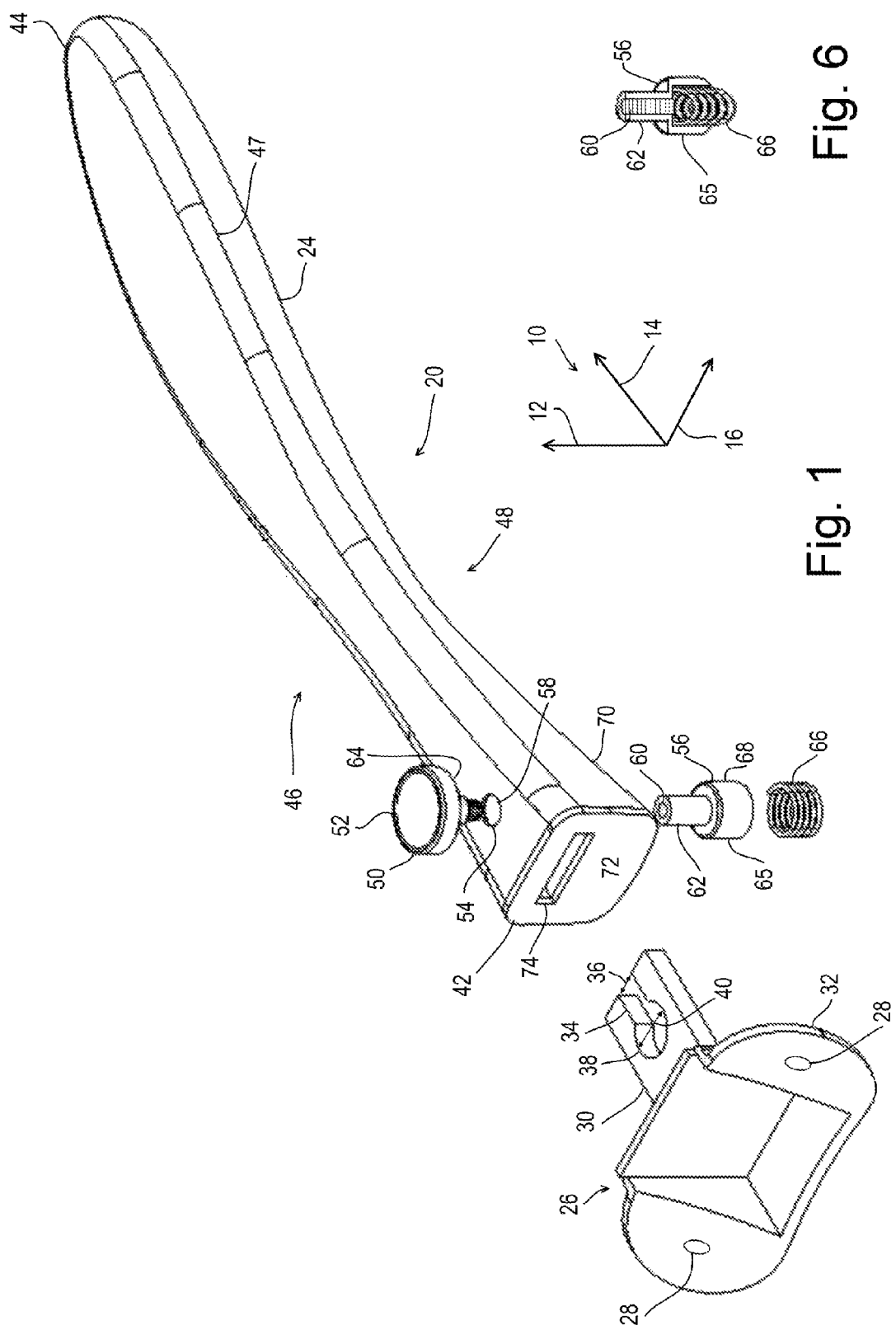
FIG. 1 is a perspective view of one embodiment of a removable handle for cookware, removed from an inter-operating bracket.
Figure 2:
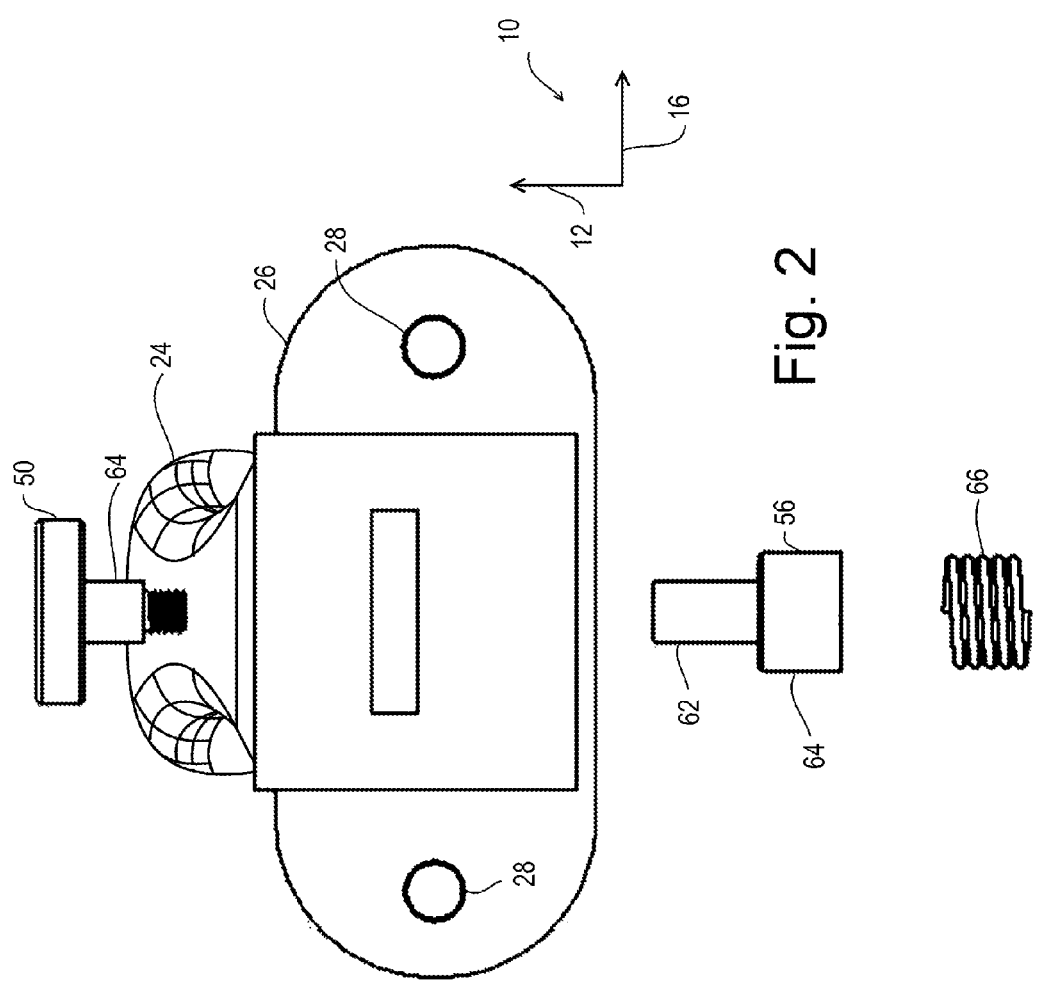
FIG. 2 is an end view of the embodiment of FIG. 1.

In addition, an axes system 10 is shown in FIG. 1 generally comprising a vertical axis 12, longitudinal axis 14, and a transverse axis 16. In general, the longitudinal axis 14 is aligned with the grasping portion 24 of the handle 20. This axes system is utilized for ease of understanding, and is not intended to limit the scope of the claims.

Looking to FIGS. 3-5, the handle 20 can be seen attached to different pieces of cookware, such as the lidded cookware 22*a* of FIGS. 3 and 5, or the cooking pan 22*b* of FIG. 4. The use of a single interchangeable and removable handle with different pieces of cookware has several advantages. One advantage is that the overall assembly is much smaller to store, as the handle may be removed and stored in a separate location, reducing the overall size of the assembly. In addition, a single handle may be utilized for multiple cooking vessels as it is common for only one handle to be utilized at a single time. Even though multiple cooking vessels may be used simultaneously, the handle is only utilized for repositioning or stabilizing the cooking vessel. In this way, when no cooking vessel is in use, only one handle need be stored, rather than separate (possibly attached) handles for each article of cookware.

Returning to FIG. 1, the handle 20 is shown separated from a bracket 26 which is normally attached to the cookware as shown in FIG. 5. In this embodiment, the bracket 26 comprises a plurality of surfaces defining voids 28 which may be utilized for fastening the bracket 26 to the cookware 22 through rivets, bolts, screw, etc. The bracket 26 may also be adhered, formed with, welded to or otherwise attached to the cookware 22. In this embodiment, the bracket 26 also comprises a tongue 30 extending longitudinally from the cookware mounting portion 32. The tongue 30 in one form comprises a surface defining a passage 34 having a width 36 extending longitudinally toward a receiver 38 having a diameter 40. The functionality of these components and services will be described in more detail.

The removable portion of the handle 20 generally comprises a proximal end 42 which is adjacent to the cookware when the removable portion 46 is in use, and engages the bracket 26. The removable portion 46 also comprises a distal end 44 which longitudinally opposes the proximal end 42. In one form, for comfort and aesthetic value, the grasping portion 24 has rounded edges 47.

To enhance utility of the device, the removable portion 46 comprises an attachment/locking mechanism 48 on the proximal end 42. The attachment/locking mechanism 48 is designed with ease of use, security of the connection between the removable portion 46 and the bracket 26. In the disclosed embodiments, cleanliness of the overall assembly was a significant concern.

To improve ease of operation, the upwardly projecting button 50 in one form has a very large engagement surface 52. Such a large engagement surface enables the user to easily depress the button 50 with their thumb or other appendage while grasping the grasping portion 24. In one form, the button 50 comprises a shaft 64 which projects downward through a surface defining an opening 54 to engage (attach to) a piston 56. In one form, the shaft 64 comprises threads 58 which engage threads 60 on the piston 56 such that both components move as a unitary element. In one form as shown, the piston 56 comprises an upper diameter 62 which in one form is substantially the same as the diameter of the shaft 64 of the button 50. The shaft 64 projects through and may contact the opening 54 to allow for and align vertical movement of the button 50 and/or a portion of the piston 56.

In one form, the bracket 26 interoperates with the attachment locking mechanism 48 by allowing passage of one portion of the piston, an not allowing a second portion of the piston. In one form, the upper diameter 62 of the piston 56 is substantially the same or slightly smaller than the width 36 of the passage 34. This allows the piston 56 to transit the passage 34 when the piston 56 is in a lower position as the button 50 is depressed downward, such as by the user. In one form, the piston 56 also comprises a lower diameter 65 which is substantially larger than the upper diameter 62, and will not pass through the passage 34 when the piston is in an upper position as the lower diameter 65 is substantially larger than the width 36. The lower diameter 65 is however substantially equal to or slightly less than the diameter 40 of the receiver 38. Thus, as the piston 56 is in an upper position, due to expansion of the compression spring 66 for example, the piston 56 cannot transit the passage 34. In this position, the removable portion 46 of the handle 20 is latched to the bracket 26.

To decrease potential contamination of the attachment/locking mechanism 48, the gap between the surface of the shaft 64 and opening 54 should be small enough that food particles and other contaminants do not easily pass there through. In addition, the attachment/locking mechanism 48 is configured wherein the lower portion of the handle 20 has no opening and the piston 56 does not pass therethrough. In one embodiment, the compression spring 66 is positioned between the lower face 68 of the piston 56 and the inner portion of the lower surface 70 of the handle 20. In another embodiment, the compression spring is at least partially contained within the portion defining the lower diameter 65. In this position, the compression spring 66 biases the piston 56 vertically upward 12 and only repositions downward when the button 50 is depressed vertically downward.

To increase stability of the handle 20 and to further reduce potential contamination into the inner workings of the attachment/locking mechanism 48, the proximal end 42 in one form comprises a face 72 with a surface defining a slot 74. The face 72 may be a surface of the larger body of the handle 20, or may be a separate face plate attached thereto. The embodiment of a face plate is especially useful when the grasping portion 24 is hollow and formed of a bent or hollow cast material. The slot 74 is substantially the same size in width transversely 16 and vertically 12 as the tongue 30 to allow the tongue 30 to fit therein. In this arrangement the slot 74 provides a fitted channel for the tongue 30, movement of the removable portion 46 relative to the bracket 26 is substantially hindered when the attachment/locking mechanism is engaged with the bracket 26.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

Therefore I claim:

1. A removable handle system for cookware, the handle comprising:
   a. a removable portion having a longitudinal grasping portion, a proximal end, an upper surface, a lower surface and a distal end;
   b. a user engagement button extending vertically from the upper surface through a surface defining a void in the upper surface of the removable portion;
   c. the user engagement button attached to a piston
   d. the piston having an upper portion with a radially outward surface defining an upper diameter;
   e. the piston having a lower portion with a radially outward surface defining a lower diameter, where the lower diameter is larger than the upper diameter;
   f. a compression spring positioned within the grasping portion between the piston and the lower surface of the removable portion, the compression spring configured to bias the user engagement button upwards;
   g. a surface defining a slot through the proximal end of the removable portion;
   h. a bracket attached to cookware;
   i. the bracket comprising a tongue having an outer surface smaller vertically and transversely than the surface defining the slot in the removable portion so as to fit therewithin; and
   j. the tongue comprising a surface defining a passage wider transversely than the upper diameter of the piston, and narrower transversely than the lower diameter of the piston.

2. The removable handle system for cookware as recited in claim 1 wherein the user engagement button and the piston are removable from each other and comprise interoperating threaded portions to facilitate attachment.

3. The removable handle system for cookware as recited in claim 1 wherein the compression spring is contained at least partially within the radially outward surface defining the lower diameter of the piston.

4. The removable handle system for cookware as recited in claim 1 wherein the user engagement button comprises a user engagement surface, which is substantially larger than the cross sectional area of the user engagement button where the user engagement button passes through the surface defining the void in the upper surface of the removable portion.

5. The removable handle system for cookware as recited in claim 1 wherein the lower surface of the handle has no opening.

6. The removable handle system for cookware as recited in claim 1 wherein the piston does not pass through the lower surface of the handle.

\* \* \* \* \*